J. S. BIRCH.
Egg-Holder.
No. 221,389.  Patented Nov. 11, 1879.
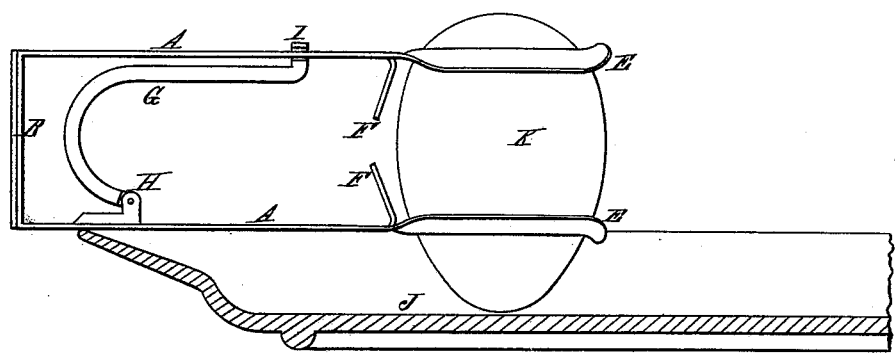
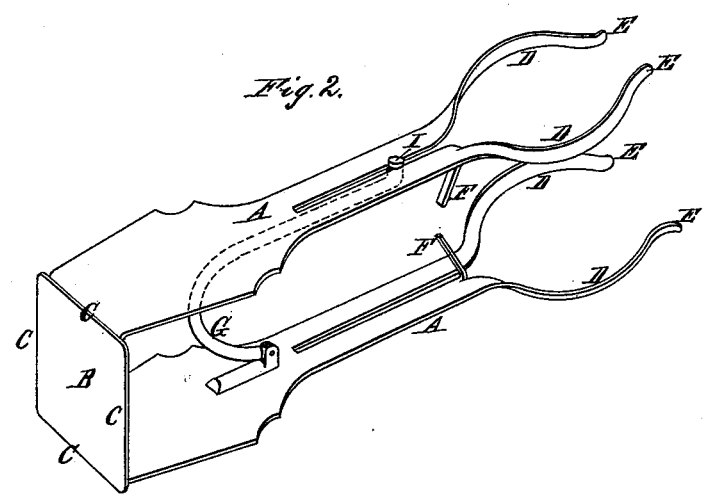

UNITED STATES PATENT OFFICE.

JOHN S. BIRCH, OF ORANGE, NEW JERSEY.

IMPROVEMENT IN EGG-HOLDERS.

Specification forming part of Letters Patent No. 221,389, dated November 11, 1879; application filed August 8, 1879.

*To all whom it may concern:*

Be it known that I, JOHN S. BIRCH, of Orange, in the county of Essex and State of New Jersey, have invented a new and Improved Egg-Holder, which is fully described in the following specification.

My invention consists of a spring griper-tongs with branched and bow-shaped, or it may be spoon-shaped, prongs adapted to clutch the sides or ends of the egg, of common use for handling and holding it at the table, so as to protect the fingers when hot, and to avoid the use of a cup when the egg is to be eaten from the shell, the said holder being better adapted to hold the egg on the plate than the cup is, so that the drippings will not soil the table-cloth, and also, by reason of a broad base, which is provided for the purpose, is less liable to overturn than the cup.

The prongs are provided with guards to compel the egg to assume the right position when they spring over it, and there is a device for spreading the prongs apart when it is desired to discharge the egg or the shell.

Figure 1 is a side elevation of my improved egg-holder and section of a plate, and Fig. 2 is a perspective view of the holder.

A represents the prongs of spring metal, connected to and projecting from the head or bow-piece B, the sides of which, C, as also the said prongs for a suitable distance therefrom, are made sufficiently broad to give substantial upright support to the egg when laid on a plate, as in Fig. 1, or similarly laid on the table, and either when the egg is griped endwise, as in Fig. 1, or when it is griped sidewise. These prongs have the ends divided into branches D, which are bowed sufficiently to gripe an egg of ordinary size about midway, or thereabout, between the ends and the center, as shown in Fig. 1, the extreme ends E being bent outward a little to facilitate the wedging of the egg between the jaws when the latter are pressed down vertically upon the upper side of the egg, which is the manner of taking it up by the holder. These branches are also bent in a kind of skeleton spoon-bowl form, and they may consist of complete bowls, adapted to hold the egg by the sides instead of the ends, as shown; but this form is preferable because it will hold either by the sides or ends, though it holds best by the ends.

To prevent the branches of one prong from slipping over one end of the egg and allowing said end to turn up toward the head B, each prong is provided with a guard, F, and the bent lever G is provided for opening the prongs to discharge the egg or shell, said lever being pivoted to one prong at H by one end, and fixed with its other end to slide along the other prong, so that by pulling in its bow toward the head B with one finger it will cause the jaws to open.

The head or bow B is also made flat, so as to enable the holder to stand upright on it, and hold the eggs upright also, if desired.

Having thus described my invention, what I claim, and desire to secure by Letters Patent, is—

1. The improved egg-holder, consisting of spring griper-tongs having either branched or spoon-shaped prongs, in combination with a broad base or side of the bow, adapted and arranged in the relation to said prongs to hold the egg upright when griped between the prongs, substantially as described.

2. The combination of guards F with the branched prongs of the spring egg-tongs, substantially as described.

3. The combination of the opening-lever device G with the branched prongs of the spring egg-tongs, substantially as described.

4. The combination of a flat head or bow with the griper-prongs, arranged to hold the same upright, substantially as described.

JOHN S. BIRCH.

Witnesses:
W. J. MORGAN,
M. J. HANLAN.